US006986953B2

(12) United States Patent
Crum

(10) Patent No.: US 6,986,953 B2
(45) Date of Patent: Jan. 17, 2006

(54) PRINTABLE MAGNETIC LAMINATE HAVING FRANGIBLE COATING FOR CLEANLY SEPARABLE ELEMENTS

(75) Inventor: Jesse D. Crum, Fort Scott, KS (US)

(73) Assignee: Ward/Kraft, Inc., Fort Scott, KS (US)

( * ) Notice: Subject to any disclaimer, the term of this patent is extended or adjusted under 35 U.S.C. 154(b) by 88 days.

(21) Appl. No.: 10/766,729

(22) Filed: Jan. 28, 2004

(65) Prior Publication Data

US 2005/0163980 A1 Jul. 28, 2005

(51) Int. Cl.
*B32B 5/00* (2006.01)

(52) U.S. Cl. ................................. 428/692.1; 428/693.1

(58) Field of Classification Search ............. 428/692.1, 428/693.1, 40.1, 41.8
See application file for complete search history.

(56) References Cited

U.S. PATENT DOCUMENTS 3,658,567 A * 4/1972 Newman et al. ............ 427/146
5,458,282 A 10/1995 Martin
5,676,307 A 10/1997 Martin

FOREIGN PATENT DOCUMENTS

GB 2292474 2/1996

* cited by examiner

*Primary Examiner*—Stevan A. Resan
(74) *Attorney, Agent, or Firm*—Michael C. Maier

(57) ABSTRACT

The present invention pertains to a magnetic laminate that may be used in the creation of an advertising, novelty or remembrance item. The laminated construction provides for containment of the coercive rings so as to substantially eliminate the migration of forces between successive sheets in a stack. The sheets may have one or more removable elements that release cleanly from the configuration through the use of a curable, frangible coating that creates a frangible bond and that does not impede the processing or handling of the sheets.

16 Claims, 7 Drawing Sheets

PRINTABLE MAGNETIC LAMINATE HAVING FRANGIBLE COATING FOR CLEANLY SEPARABLE ELEMENTS

CROSS-REFERENCES TO RELATED APPLICATIONS

None.

FIELD OF THE INVENTION

The present invention relates to laminates having a magnetic component, with a pre-existing charge that makes the laminate suitable for use as an advertising piece, novelty, remembrance or other articles that is intended to be retained as a keepsake such as one placed on a metal surface. More specifically, the present invention pertains to a laminated configuration that may be variably imaged to produce personalized or individualized items. The magnetic construction includes a printable or imageable surface and a unique arrangement in which the poles of the magnetic material can be separated from one another via a gap or magnetic void so as to substantially reduce migration of forces between sheets and thus prevent "lock up" of successive sheets when placed into a stack. The present invention also includes a frangible coating, created through the application of specific curing energy to a coating that has been applied to an area between the magnetic material and supporting layer so as to enable the clean separation of one or more individualized magnetic elements from the laminated configuration.

BACKGROUND OF THE INVENTION

There are numerous magnetic products available in the marketplace today. Magnetic materials have become increasingly common in the business forms and labels industry for their ability to provide the customer with an advertising or remembrance piece that can be passed along or saved for future reference.

Today's growth of new technology plays a vital role in creating and providing businesses with laser compatible forms and products that can be used in a variety of businesses and industries. The rise in the interest of articles having magnetic components has created a demand for the availability of such products but also has presented the manufacturer with the difficulties of including this auxiliary material along with traditional form and product stock.

In addition to the difficulties associated with having to add what amounts to a large "chunk" of material, one which typically ranges from 5 to 12 mils, onto a substrate is that the magnetic materials when placed in a stack can create a sloped stack (one side of the stack higher than the other due to the increased thickness of the magnetic material) as well as a stack that is difficult to align or handle due to the magnetic fields created by the coercive forces between poles in successive magnetic sheets. This can cause the sheets to splay or shift out of alignment making repetitive and continuous feeding difficult and often reducing such an operation to an incremental production of stops and starts so as to accomplish the production of the job.

Magnets have been previously attached to materials and used for purposes of marketing and advertising. Some exemplary prior uses of magnets include calendars, business cards, and frames for photographs, advertising collateral and the like. One example of such a prior art construction is provided in U.S. Pat. No. 5,458,282. The construction includes a solid magnet that is attached to one end of a substrate and, placed between end edges of the substrate. The magnet is then separable from the substrate via a separation line. The difficulty associated with such prior art constructions is that this construction is often limited in usage to the one advertising arrangement provided with the assembly. That is, the magnet may contain a single business card or reference or contact number and the adjoining substrate may only include printed indicia related to that one event.

Such single purpose forms aren't generally economical for use by small businesses or groups or associations as minimum quantities of such products may require the purchase of several hundred or even several thousand units, whereas a small business may only need a few dozen for selected customers, and then for those products to be potentially personalized.

In addition, to the foregoing drawback, such a construction also requires a magnetic piece to be physically juxtaposed on to a substrate in order to use the product for its intended purpose, that of enabling the substrate to be applied to a metallic surface. Due to the increased thickness of the magnetic material, the substrate along with the magnet attached thereto cannot easily pass through a laser or other non-impact printer due to the hump or bump created by the magnet. This hump can distort the printing of the substrate and potentially cause excessive wear and tear to the print head of the printer due to the abrupt contact with the raised area of the magnet. Thus, the substrate must first be printed and then have the magnetic piece attached thereto. As might be expected, this can create alignment problems if the magnetic material is applied to the incorrect area of the substrate.

Another example similar to the foregoing construction is represented by U.S. Pat. No. 5,676,307 to Martin which teaches the use of a substrate to which a magnetic strip has been adhesively applied or juxtaposed entirely over one end of the substrate, but not the entire substrate. The magnetic material is again exposed and would be subject to coercive magnetic forces if the product were placed in a stacked configuration with other similar magnetic products. That is, there is no shield or gap to prevent the magnet of one sheet from interfering with the magnet of a successive sheet. The magnetic portion of the product is then separated through the use of one or more lines of weakness.

These products suffer from several drawbacks. Initially, the line of weakness creates a jagged edge arising out of the separation of the ties from one another in the area of the line of weakness. Where the product is to be used as a remembrance item, it is highly undesirable to have an item which produces a less than desirable aesthetic feature. Secondly, a construction having such a differential height arrangement can cause problems for printing and processing equipment as discussed above. While Martin proposes the use of a ramp or beveled edge to reduce this problem, the ramp or sloped edge has been provided on one edge of the magnetic strip, the edge that is adjacent the exposed or uncovered portion of substrate of the construction. This requires the feeding of the form in only a single direction so that the processing equipment can utilize the benefit of the sloped edge.

Another prior art product is provided in UK Patent Application 2,292,474 which discloses the attachment of a ceramic magnetic disc to the back of a business card, after the business card has been prepared. This allows a user the ability to create a magnetic business card after the card has been prepared or printed. Such a product configuration however requires that the user maintain a supply of imprintable card stock, magnets and a means to attach the magnet to the card stock material. In addition, the concept utilized by the '474 application would not enable the subsequent processing of the material due to the differential thickness of the magnet on the card or stock.

More importantly however, the foregoing thus eliminates the ability for use of such products by small office/home office ("SOHO") environments, as such environments would not have the desire to purchase rolls of magnetic material, cut the material to size and then affix the material to the substrate being printed. In addition, this prior art construction then virtually eliminates the ability to individually personalize such magnetic pieces, regardless of the size of the business.

Other prior art solutions may utilize a sheet of magnetic material which may be printed upon. However, in order to process this particular construction the magnetic material is provided in a deadened state, one in which there is no readily discernable magnetic force or alternatively it is so weak that the magnetic material as provided is incapable of adhering to a metallic surface. Thus, the manufacturer after printing or processing the sheet must then "charge" the magnet so that it will have a sufficient force to adhere to a metal surface. As expected, the additional step of charging the magnet is time consuming and adds a further layer of expense to the offering being presented. In addition, even after the charging, the magnetic sheets are difficult to handle and cannot be wrapped in a flat stack as the coercive forces of each of the magnetic pole regions causes successive sheets to splay or shift out of alignment with one another.

Solutions to the issue of splaying have been to increase the size of the material that rests between the magnetic material or to use inserts which effectively mitigate the magnetic forces between sheets by separating the sheets a sufficient amount that the coercive forces do not interact. However, in addition to the added costs of the thicker material or inserts, there is the added cost associated with transporting and shipping the material due to the increased thickness or inserts.

A still further solution to this prior art problem was to use a thinner magnetic material, one which was capable of holding only a lesser magnetic force. This construction unfortunately suffers from the drawback that the magnet may not adhere to the desired surface due to the relatively weak field.

Where it has been tried to create an image on a magnetic sheet, that retains a charge, the charge present in the sheet can cause the sheet to migrate out of alignment with the image generator, thus causing the image to appear off center, or be partially cut off. This unfortunately leads to significant waste and disappointment. In addition, where such sheets can be successfully printed, the sheets have a tendency to "lock up" or stick together making quick separation and distribution difficult.

In creating remembrances such as photographs and other personal memorabilia, there has been a desire to image or produce images of subjects, such as students and to create removable magnetic elements that have a clean, sharp peripheral edge that resemble a conventional photograph, but which do not require additional frames, adhesives and the like to hold the photograph.

What is needed therefore is a magnetic product that overcomes the foregoing drawbacks and which renders itself to the production of cleanly removable elements having a pleasing presentation.

Publications, patents and patent applications are referred to throughout this disclosure. All references cited herein are hereby incorporated by reference.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention provides a unique laminated configuration that is suitable for creating advertising, memorabilia, remembrance items and the like. The magnet laminate of the present invention overcomes the foregoing drawbacks by producing a product that is readily and cleanly removable from the construction as well as provides a laminate that can be processed by a manufacturer or user without the necessity of supplemental processing steps or the inclusion of auxiliary materials.

In one embodiment of the present invention, a magnetic laminate is provided and includes a first layer that is capable of receiving an image. The first layer has a first face and second face and a first dimension. The laminate of this embodiment further includes a magnetic material that has a first and a second face as well as a pre-existing magnetic force. An adhesive is used and is applied on one of the first and second faces so as to adhere the first layer to the magnetic material. The magnetic layer used in this laminate has a second dimension that is substantially coextensive with the first dimension. The magnetic layer with the first sheet adhered thereto is also provided with a plurality of die cuts that create a plurality of removable portions.

The presently described embodiment includes a release layer that has a first and second face. The release layer is provided with a coating to create a frangible bond in at least those areas that are covered by the removable portions of the magnetic layer. The release layer has a third dimension that is substantially coextensive with at least the removable portions of the magnetic layer. The coating between the magnetic layer and release will, upon separation of the removable portions from the release layer, provide the removable portions with substantially no residue on the magnetic material.

In a still further embodiment of the present invention, magnetic remembrance article, is described and includes a laminate that has a printable layer, a magnetic layer and a release layer with each of the layers having first and second faces. Each of the layers has a size that is substantially coexistent with one another.

The printable layer of the presently described embodiment is adhered to the magnetic layer such that the second face of the first layer is secured to the first face of the magnetic layer and the first layer and the magnetic layer are provided with die cuts to produce a plurality of removable remembrance pieces. At least one image is provided on each of the removable pieces, however different images may be provided on each removable piece.

In this embodiment, the first face of the release layer is joined to the second face of the magnetic layer through a curable coating that creates a frangible bond between the release layer and the removable pieces.

In a yet still further embodiment of the present invention, a method of producing a magnetic remembrance article is described and includes the steps of initially producing a laminate, with the laminate comprising first, second and third layers. The third layer is bonded to the second layer through the use of a frangible coating. The first layer is adhered to the second layer on a face opposite to that of the third layer. The second layer consists of a magnetic material that has a pre-existing magnetic force. Next, a plurality of removable remembrance pieces are created by die cutting through at least the first and second layers of the laminate. Then a number of images of items are generated or created and are stored for subsequent rendering. The images may be stored in a data base, file or the like until they are needed for use. Next, at least one of the previously captured images is imaged or printed on the remembrance pieces. Once the printing or rendering has been completed then one or more of the remembrance pieces can be removed from the laminate through the use of the die cuts and then attached to a metallic surface by the magnetic material.

In a further exemplary embodiment of the present invention a method of marketing a magnetic remembrance article, is described and includes the steps of initially producing a laminate that is capable of receiving an image and one in which a number of removable remembrance pieces have been created through the use of die cuts and the like. The laminate that is used in the presently described method includes at least first, second and third layers with each of the layers being substantially coexistent with one another. The second layer consisting of a magnetic material that has a pre-existing magnetic force. A series of images is then captured from a pre-determined group. The product is then offered with the collected images on the removable remembrance pieces in a number of pre-defined configurations. At least one of the series of images is rendered or otherwise produced on at least one of the removable remembrance pieces and then the laminate with at least one image is delivered to a member of pre-determined group that has accepted the offer.

These and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

As used herein the term "remembrance" item, article or element includes but is not limited to memorabilia, advertising and marketing collateral, souvenirs, tokens, trophies and certificates, keepsakes, reminders and generally other images and indicia that are intended to call to mind something about the provider of the product or the image or indicia printed or produced on the surface of the product.

As used herein the terms "capture" or "generating" as it relates to the capture, generation or collection of images can include digital means, cameras, scanners, optical devices and such other means as are necessary to collect images indicia or the like for subsequent rendering to the surface of the laminate of the present invention. The steps of imaging and capturing can be accomplished substantially simultaneously or may occur independently from one another.

Surprisingly, it has been found that a laminate containing a magnetic piece can be produced and processed without the difficulties heretofore encountered so as to create a laminated sheet having a series of removable remembrance pieces. The laminate of the present invention will typically come in one of a number of formats or sizes, such as 8½" by 11", 11" by 17", 8½" by 14" and other sizes that can be accommodated by a printing or imaging device.

Figure 1:
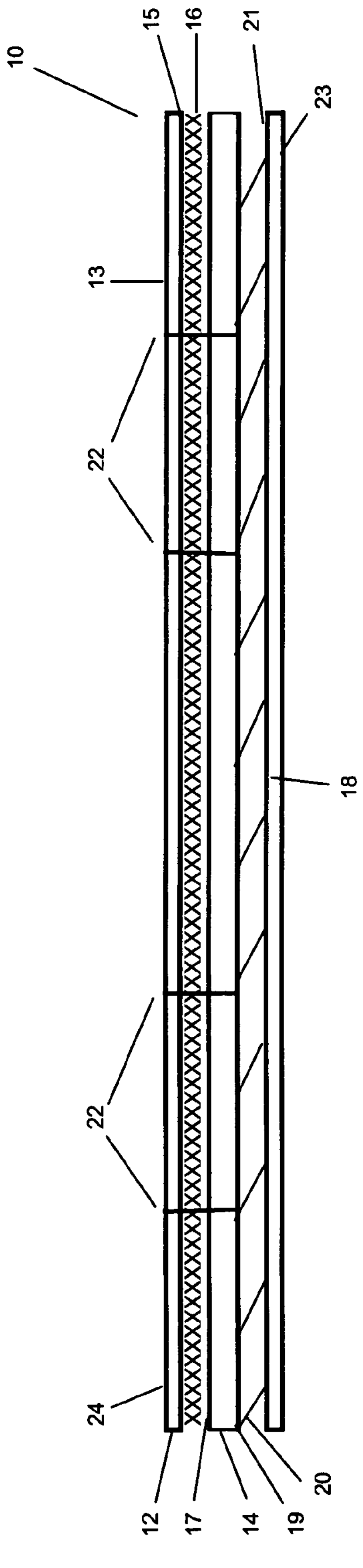
FIG. 1 depicts a side elevation of the laminate of the present invention illustrating the layers used in the construction of the laminate.

FIG. 1 of the present invention shows a side view of the laminated construction. The laminate, generally represented by reference to numeral 10 includes a first layer or coating 12. The first layer or coating may be a sheet of cellulosic stock such as 20 pound bond paper or may be machined paper having a reduced thickness so as to reduce the overall thickness of the laminate. Alternatively, the first layer 12 may also be coating that is receptive to holding an image, such coating may include an opaque white ink, glazing or the like which would generally conceal the color of the magnetic layer 14 from showing through. In addition, a printable synthetic (PET, polypropylene) or metalized film may be used depending upon the desired appearance of the product, such as in attempting to achieve a particular look or attribute for the remembrance item. The first layer 12 may also serve as a shielding layer to reduce the coercive forces of the magnetic material. The first layer 12 has a first face 13 and second face 15.

The magnetic layer 14 has a pre-existing magnetic charge and may be purchased from Strata-Tac, Inc. of Batavia, Ill. The magnetic material 14 has a thickness ranging from about 3 to approximately 12 mils with about 5 to around 7 mils being preferred. The magnetic layer 14 has first and second faces 17 and 19 and where a cellulosic stock or synthetic film is used, is adhered to the first layer 12 through use of adhesive 16. The adhesive 16 may be any suitable pressure sensitive adhesive such as an acrylic based adhesive available from National Starch of Chicago, Ill. The second face 15 of the first layer 12 is adhered to the first face 17 of the second layer 14.

The magnetic material making up the magnetic layer 14 has a pre-existing charge of about 12 to about 22 poles per inch with about 14 to approximately 18 poles per inch being preferred.

The laminate 10 depicted in FIG. 1 is provided with a third layer 18 which acts as a release material. The third layer 18 has first and second faces 21 and 23. The third or release layer 18 is bonded to the magnetic layer 14 through the use of a curable coating 20 that creates a frangible bond as will be described herein. The first face 21 of the third layer 18 is adhered to the second face 19 of the second layer 14 so that the first layer 12 is on an opposite side of the magnetic layer 14 from that of the third or release layer 18.

The third layer or release layer 18 of the present invention can range from a transparent to translucent to a semi opaque sheet of material that may be derived from cellulosic materials such as paper, glassine, wax paper, and the like to synthetic materials that will enable the treatment energy to pass through the layer so as to be able to cure the coating in-situ. The thickness of the second layer or sheet 18 can range from about 1 mil up to about 7 mils and more preferably between about 2 mils to about 3 mils with about 2.2 mils to about 2.5 mils being preferred. One exemplary sheet suitable for use in the present invention that enables sufficient energy to pass through is UV230 from Nicolet Paper of Depere, Wis. Another exemplary layer is a machine finished 400MF available from Wassau Paper of Wassua, Wis. However, standard 20 pound bond paper may also be used and is suitable for passing sufficient energy through to enable the curing of the UV curable coating through the paper.

An exemplary coating 20 of the present invention is a UV curable coating distributed under the product name FT30LI and is available from Northwest Coatings Corp., Oak Creek, Wis. 53154 and is composed of various acrylate monomers and oligomers. The coating maintains a boiling point of greater than 200° C., a vapor density of greater than 1 (air=1), an evaporation rate of greater than 1 (n-Butyle Acetate=1) and a vapor pressure of less than 1 (MM HG at 25° C.). The coating is not an adhesive coating but rather creates a temporary bond between the layers which when separation force is applied, the bond breaks allowing the layers or pieces to be removed. Once broken, the layers or bond cannot be re-adhered to one another.

The production of the present invention is relatively straight forward and includes the provision of a material that will make up the third layer 18 of the laminate, such as a translucent sheet of glassine or machine glazed or machine finished paper having a thickness ranging from about 1 mil to about 3 mils. The UV curable coating is applied to the layer or sheet 18 in a thickness ranging from about 0.0001 mils to 3 mils with about 0.01 to 1 mils being preferred and 0.5 mils being still more preferred. Next, a top construction, consisting of a combination of a magnetic layer 14 with the top or first layer 12 applied is placed in registry and alignment with the release sheet 18 so as to create an intermediate laminate, in which the sheets or layer have not yet been bonded together.

The top portion of the construction or laminate is prepared by advancing the first layer 12, for example a 20 pound bond stock, which may have an adhesive applied thereto along with the magnetic layer 14 and then joining the two layers together such as at a nipping arrangement. Alternatively, the adhesive may be provided on the second layer 14 rather than the first layer 12.

The coating 20 may be applied throughout the entire area of one of the third 18 layers so as to create an entire coated sheet or a substantially coated sheet or the coating may only appear in the area of the die cuts that form the removable pieces or other elements. The die cuts or stampings 22 as shown in FIG. 1 are typically only applied to the first and second layers 12 and 14 as the bottom sheet or third layer 18 forms a carrier layer which will remain with the matrix of the top sheet once the removable elements have been removed. That is, once the removable piece has been separated from the construction, the surrounding area 24 which makes up the residual matrix remains in the laminate 10. The die cuts 22 used to create the removable pieces may be provided in such a manner so that the removable elements are substantially adjacent one another, that is the removable pieces may share a common die line or alternatively, the die cuts 22 may be provided so that the removable pieces are separate from one another thereby leaving a matrix.

Figure 2:
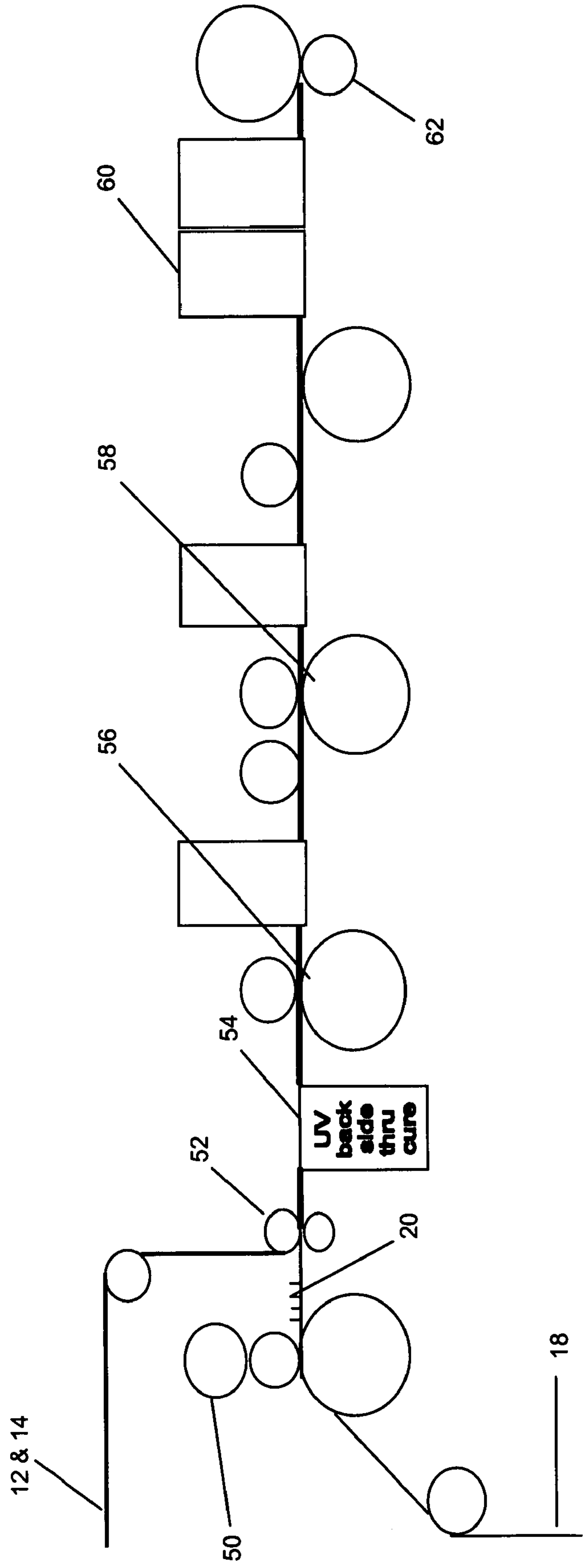
FIG. 2 shows a schematic of the present invention providing a representation of the equipment and process used to manufacture the present assembly.

Reference is now directed to FIG. 2 so that a better understanding of the manufacture of the invention can be obtained. As described above, the first and second layers 12 and 14 are adhered together and advanced to a nip station 52. The release or third layer 18 is fed to a coating station 50 where the coating 20 is applied to the first face of the third layer 18. After the coating 20 has been applied, the coated layer 18 is fed to the nip station 52 where the first and second layers 12 and 14 are joined to the third layer 18 to form the laminate 10 of the present invention.

Once the intermediate laminate 10 has been created the intermediate assembly (intermediate as it has not yet been bonded and finally formed into the laminate) is then forwarded to a curing station 54 where at least one if not additional UV curing stations which contain UV bulbs that are provided for curing purposes. The curing stations 54 may use "H" bulbs described below and/or the Gallium bulb, which is also described below.

In practicing an exemplary embodiment of the present invention, a series of UV curing bulbs, which can be positioned in a side by side, adjacent or sequential configuration, can be used. In an exemplary embodiment, a single bulb may allow a UV cure rate of approximate 50 to 60 feet per minute, while plural bulbs disposed in a side-by-side or adjacent configuration permits a higher curing rate of approximately 75 feet per minute. Obviously, other curing station configurations may be used in order to increase the possible through put rate of the equipment and processing of the substrates to be printed.

Exemplary bulbs used in the embodiment of the present invention are "H" bulbs and Gallium doped bulb suitable for use in the UV curing processes, however, it should be understood that other UV curing may be used in accordance with the present invention and the present invention is not limited hereto.

The "H" bulb is generally known as a mercury vapor bulb and is used typically for top surface curing applications. The Gallium doped bulb is used in connection with a requirement for deeper penetration or for penetrating through a thicker substrate. The UV bulbs such as those described above along with reflectors, to focus or concentrate the energy, are available from the GEW Company, located in North Royalton, Ohio. Alternatively, a combination of both topical and penetration curing can result in a combination of curing energies sufficient to carry out the present invention.

The sheets or layers of the present do not need to be water vapor impermeable and may be selected from any suitable stock to which the coating may be applied and die cuts may be rendered or produced to create at least one if not an entire series of removable elements.

Once the laminate 10 has been cured and the coating 20 has bonded the third layer 18 to the second or magnetic layer 14, the laminate 10 may be fed to a first die cutting station 56 and then possibly to a second die station 58 where removable elements having differing configurations may be provided and as will be described herein. Once the die cutting is complete, the laminate 10 is then forwarded to an imaging station 60 where the images that have been previously collected can be rendered or provided on to the surface of the laminate 10. It should be understood that the printing/imaging station or stations can come prior to the die cutting stations depending on the needs or arrangement of the manufacturers equipment. Finally, the laminate 10 if it has been provided in a continuous or web fed arrangement is sheeted at station 62.

The present invention may be practiced by feeding sheets or webs. For convenience of this discussion, the schematic was depicted in a continuous web fed configuration. The die cutting may be provided so as to create adjacent removable elements or the removable pieces may be spaced apart in the laminated assembly.

The structure of the laminated 10 assembly of the present invention is generally if not substantially planar, that is there are no bumps or ridges such as with a protruding card or label which would interfere with the processing of the laminated assembly through a non-impact printer, such as a laser printer or ink jet printer.

Figure 3:
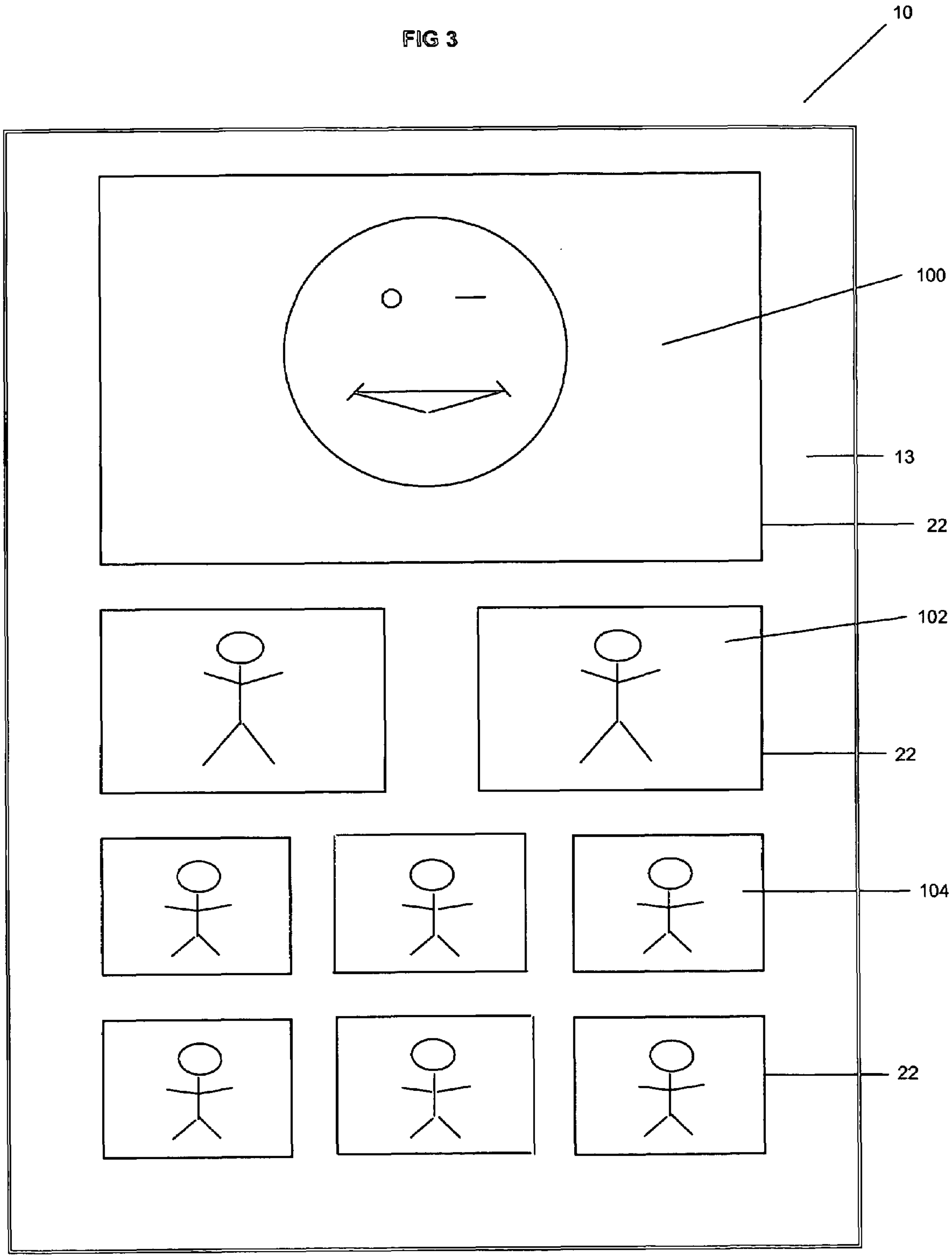
FIG. 3 illustrates a front view of one aspect of the present invention showing a plurality of removable remembrance elements.

Turning now to FIG. 3, a front view of the present invention is provided depicting one potential application of the laminate 10. The laminate 10 is provided with a series of removable remembrance pieces or elements, depicted generally by reference numerals 100, 102 and 104. Each of the pieces or elements are created through the use of die cuts 22 which extend through the first and second layers 12 and 14 as shown in FIG. 1 and discussed above.

The remembrance elements 100, 102 and 104 as shown provide a pictorial representation of one image of one subject that may be selected from a previously established group. The group includes but is not limited to sports teams, education groups, classes, institutions, businesses, departments, associations, affiliations, fraternities, sororities, unions, fellowships, memberships, guilds, leagues, orders, organizations, societies and combinations thereof. The elements 100, 102 and 104 are shown having different dimensions such as those that might be offered in connection with an individual portrait, including 5"×7", 2"×4" and 1"×2" or such other sizes as the manufacturer would elect. It should be understood that the dimensions of the cutout elements 100, 102 and 104 may all be the same as provided in FIG. 4.

Figure 4:
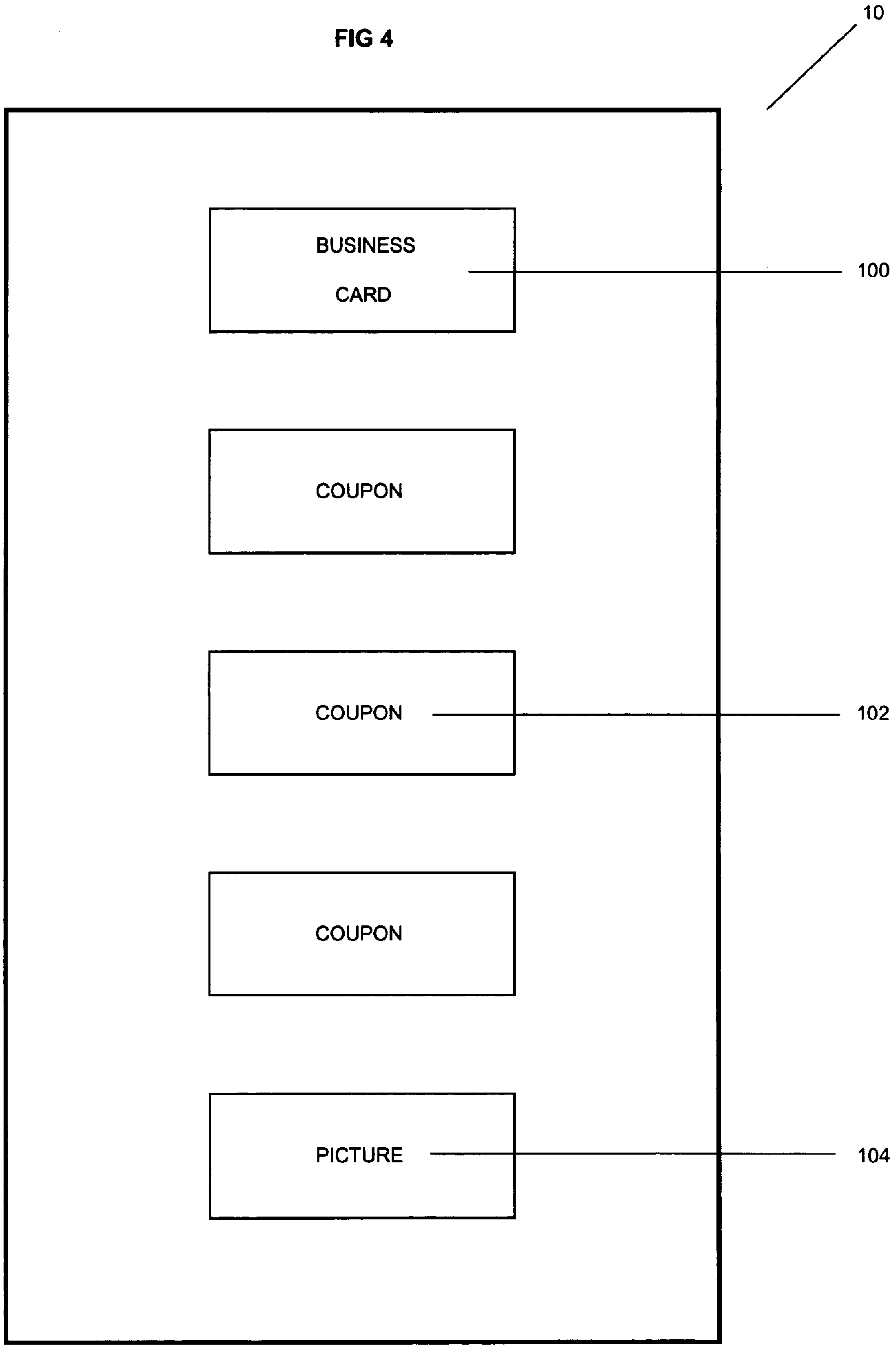
FIG. 4 provides a front view of an alternate embodiment of the present invention.

Turning now to FIG. 4, an alternate embodiment is provided and includes the laminate 10 having removable pieces 100, 102 and 104 of all the same dimensions. In this configuration, the laminate 10 may be used as advertising, souvenirs or other memorabilia. Removable piece 100 is depicted as a business card, 102 as a coupon related to a service or offering and 104 as a picture such as a resort that the coupon may be used at, for instance a spa coupon or a depiction of a meal that the coupon could be used for a reduction off the purchase price. It should be understood that there is no limit to the type of products, services and offerings that may be provided in connection with the laminate of the present invention.

Figure 5:
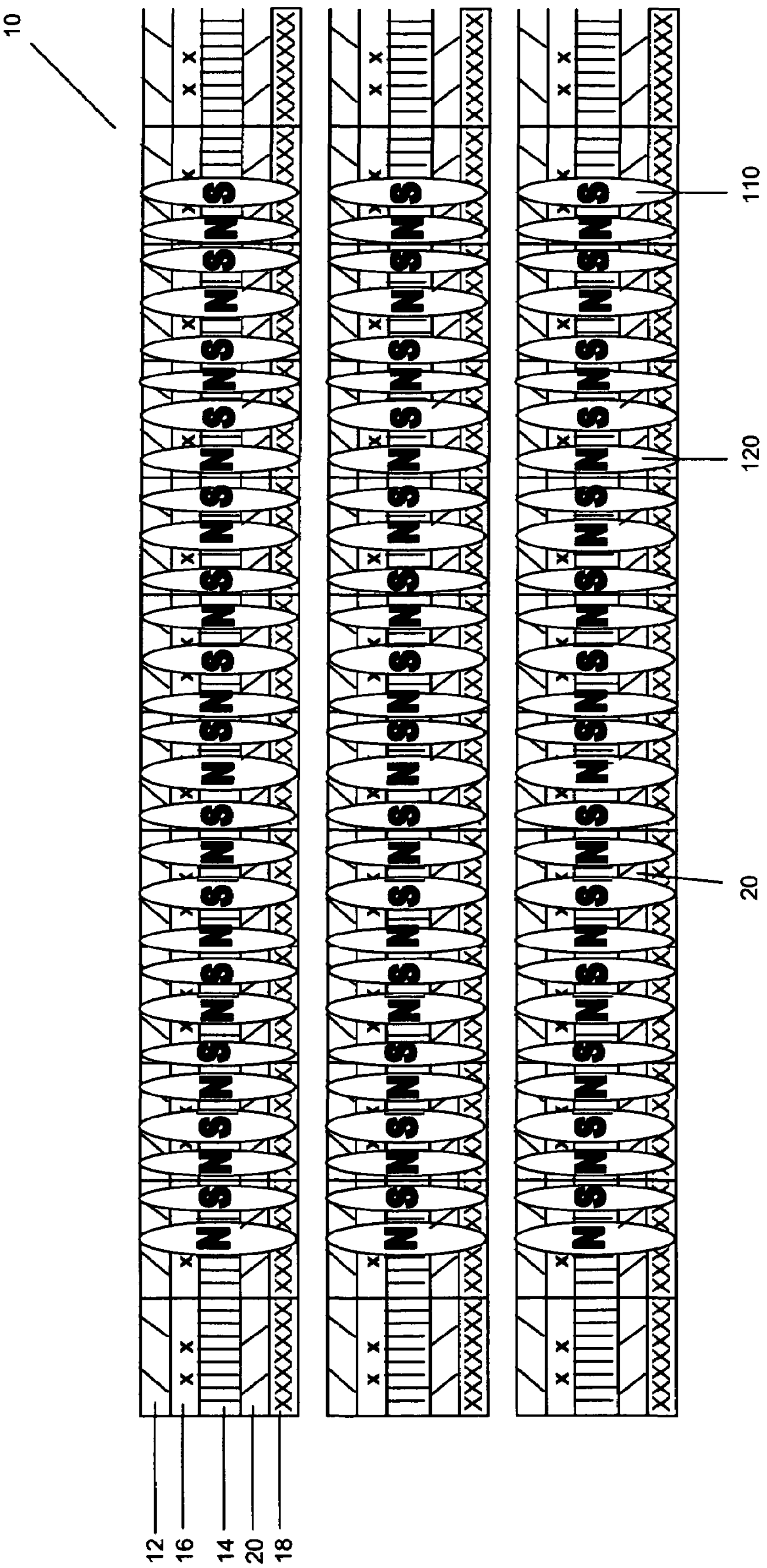
FIG. 5 shows the coercive forces of the magnetic fields in a cross section of the laminate in a stacked configuration.

Reference is now directed to FIG. 5 of the present invention which provides a cross section of a series of laminates 10 in a stack configuration and depicting the poles, north 120 and south 110, of the pre-existing magnetic forces resident in the magnetic layer 14. As can be seen from the drawing, the north and south poles 120 and 110 are in alignment with one another and do not cross over into the poles of the adjoining laminates which would otherwise cause the sheets or laminates to splay out of alignment. That is the poles would have a tendency to shift the sheet above or below it one way or another so that the coercive forces of the poles do not interfere with one another.

Unexpectedly, it has been found that the coating 20 of the present invention creates a sufficient gap or magnetic void (an area where there are no magnetic forces or where the magnetic forces are substantially diminished so as to not interfere with successive sheets in a stack having a magnetic component) such that the combination of the gap and first and third layers 12 and 18 create a degree of separation ranging from about 4 to around 7 mils and more particularly between about 5 and approximately 6 mils. That is, the first layer 12 has a thickness of about 2 mils, the third or release layer 18 has a thickness of about 3 mils and the coating 20 a thickness of around 0.5 mils. This creates a ratio of magnetic material to air gap of approximately 1.2 to 1.

Figure 6:
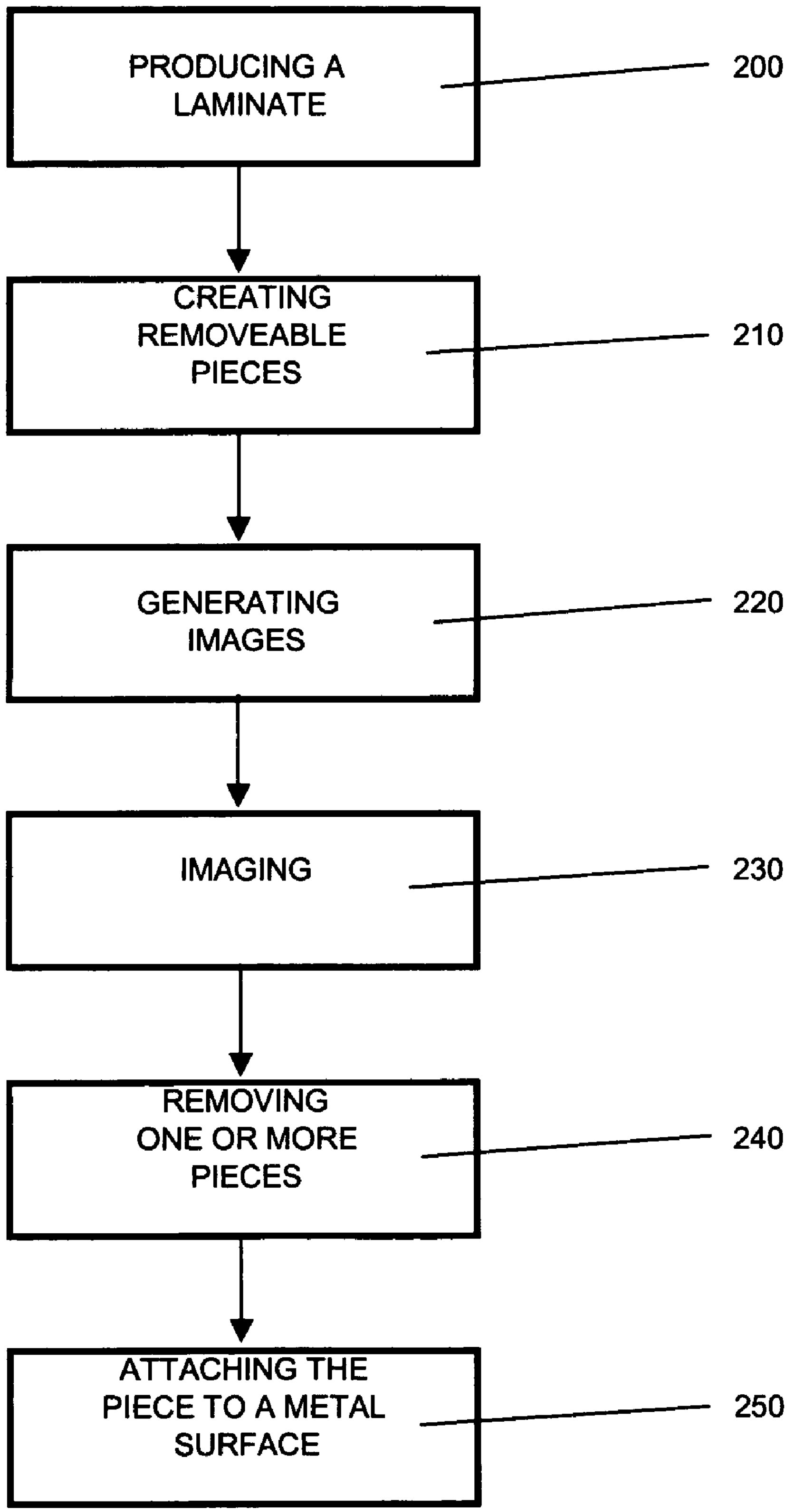
FIG. 6 depicts a block diagram illustrating the method of producing the laminate in accordance with the present invention.

FIG. 6 provides a block diagram relating to the manufacture and use of the laminate 10 of the present invention. Initially, a laminate is produced at step 200. The laminate includes three layers, with the middle layer being a magnetic material that has a pre-existing magnetic force of about 14 to approximately 18 poles per inch of material. Next, the laminate, once formed as provided in connection with the description accompanying FIGS. 1 and 2, is subjected to die cutting at step 210 to create a number of removable remembrance pieces or elements. The pieces may have similar dimensions or may have variable dimensions depending on the end user and the customer requirements.

Either separately or concurrently with the creation of the laminate of the present invention, images are generated at step 220. Generation of images includes the taking of photographs, scanning of imaging and/or text or the otherwise capture of images to be rendered or produced on the surface of the laminate. The images can be stored in a file or data base once they are generated and the storage area can be at the same location as the laminate manufacture or may be provided remotely and the images thus transmitted via a global communications network or other suitable means to the location where the production is occurring.

Next, the laminate is imaged at step 230. Imaging can be done by any suitable means such as ink jet, laser printer or the like. In one exemplary embodiment, the imaging is accomplished through the use of INDIGOS press available from Indigo of Tel Aviv, Israel. Typically, in the imaging, such as in the production of an individual's photograph, creation of a picture such as a landscape, resort or the like, the image produced should be of a high quality so as to adequately and accurately depict the item being displayed.

Once the imaging is complete, a customer or end user would then remove the piece at step 240. The removal of the piece is achieved through the die cuts, score lines or other suitable means that would enable the separation of the piece from the remaining portion of the laminate.

Finally, the removable piece is then applied to a metal, metallic or other surface that is capable of receiving a magnet at step 250. The final step enables the image produced at step 230 to be displayed.

The removed remembrance piece has substantially no residue from coating 20 on the exposed or second face of the magnetic layer. This prevents the magnetic piece from staining or leaving residue on the surface to which the magnet has been applied thereby enabling the piece to be removed and reused over and over.

One of the most important things with respect to new product innovations is the need to effectively market and communicate the new product to potential customers and end users of the product. Such marketing typically includes the creation of marketing collateral associated with the features of the laminated assembly of the present invention and then selling the assembly in connection with that marketing collateral and distributing the laminated assembly along with the marketing ideas to potential end users and customers. Customers can include distributors of such products as well as office supply stores, retail and warehouse outlets that may not be end users, but may repackage and resell the products to end users or third parties, photography studios and services, identification needs and the like.

Marketing collateral as used herein includes the use of scripted or prepared material that are distributed through audio and visual communication mediums, over a global communication network, through printed mediums such as newspapers, trade publications, magazines, fliers, handouts and the like.

Figure 7:
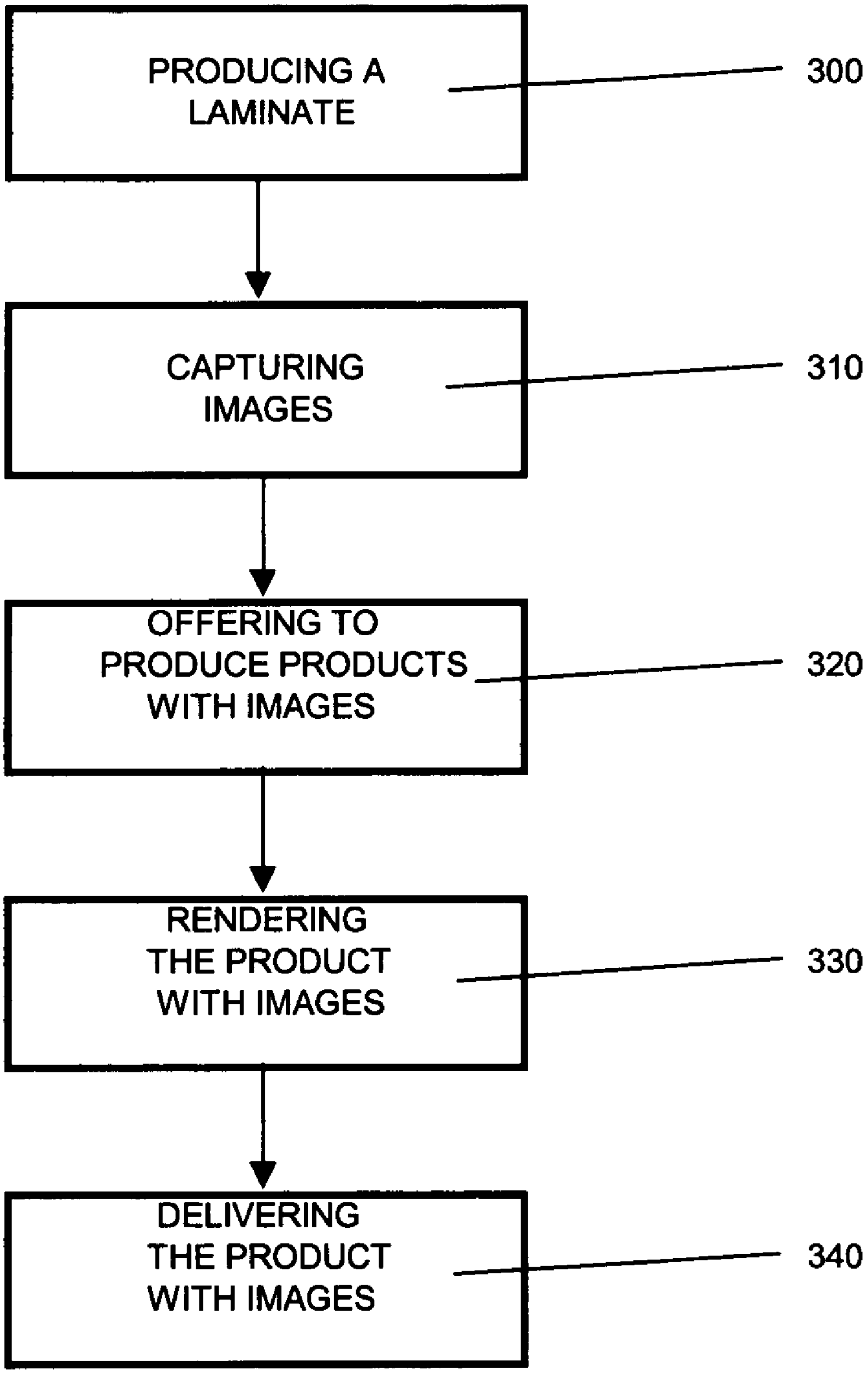
FIG. 7 illustrates a block diagram depicting the method of marketing the present invention.

Turning now to FIG. 7 a block diagram is presented that shows how the present invention may be marketed and offered to potential users. First a laminate, having magnetic properties and as described herein is produced at step 300. Then images are captured at step 310 such as through photographic means, scanners and other optical capture devices, including digital reproduction. Next, exemplary products can be shown to prospective end users illustrating the present invention along with the offer to produce such products for the particular end user at step 320.

After the end user has accepted the offer and placed an order with the manufacturer, the images captured at step 310 can be rendered at step 330. The rendering of images is done through any suitable means that is sufficient to accurately depict the subject contained within the image. It should be understood that the capture of the images may come after the offer to produce product has been made and accepted. Such as with the taking of photographs at a sporting event, academic institution or the like.

Finally, once the images have been produced on the laminate of the present invention, the laminate may be delivered to the end user or directly to customers of the end user at step 340.

It will thus be seen according to the present invention a highly advantageous magnetic laminate suitable for use in creating remembrance pieces has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A magnetic laminate, comprising;

a first layer capable of receiving an image, said first layer having a first face and second face and said first layer having a first dimension defined by edges of said first layer;

a magnetic material having a first and a second face and having a magnetic force, an adhesive provided on one of said first and second faces so as to adhere said first layer to said magnetic material to form a first laminate, and said magnetic layer having a second dimension defined by edges of said magnetic layer substantially coextensive with said first dimension and said magnetic layer with said first layer adhered thereto having a plurality of die cuts to create a plurality of removable magnetic portions;

a release layer having a first and second face, said release layer is provided with a coating to create a frangible bond in at least areas covered by said removable magnetic portions of said magnetic layer, and said release layer having a third dimension defined by edges of said release layer substantially coextensive with at least said removable portions; and said frangible bond upon separation of said removable magnetic portions from said release layer provides said removable magnetic portions with substantially no residue on said one of said first and second faces of said magnetic material.

2. A magnetic laminate as recited in claim 1, wherein said removable magnetic portions have different configurations.

3. A magnetic laminate as recited in claim 1, wherein said removable magnetic portions have substantially equivalent dimensions.

4. A magnetic laminate as recited in claim 1, wherein said magnetic material has a thickness ranging between 3 and 12 mils.

5. A magnetic laminate as recited in claim 1, wherein successive laminates are placed into a stack.

6. A magnetic laminate as recited in claim 1, wherein said coating with said release layer and first layer creates an air gap between successive laminates in said stack.

7. A magnetic laminate as recited in claim 6, wherein said air gap has a thickness ranging from about 1 to about 7 mils.

8. A magnetic laminate as recited in claim 6, wherein said air gap to said magnetic layer has a ratio ranging from about 1 to about 1.2.

9. A magnetic laminate as recited in claim 1, wherein said first laminate has magnetic poles in said magnetic layer which are aligned with a series of magnetic poles in a second, identical laminate when placed in a stack.

10. A magnetic remembrance article, comprising;

a laminate, said laminate comprising a printable layer, a magnetic layer and a release layer with each of said layers having first and second faces;

each of said printable layer, magnetic layer and release layer having a size substantially coexistent with one another, said printable layer is adhered to said magnetic layer such that said second face of said printable layer is secured to said first face of said magnetic layer and said printable layer and said magnetic layer are provided with die cuts to produce a plurality of removable magnetic remembrance pieces;

at least one image is provided on each of said removable magnetic pieces; and said first face of said release layer is joined to said second face of said magnetic layer through a curable coating that creates a frangible bond between said release layer and said removable magnetic pieces.

11. A magnetic remembrance article as recited in claim 10, wherein said magnetic layer has a magnetic force.

12. A magnetic remembrance article as recited in claim 10, wherein successive laminates are placed into a stack.

13. A magnetic remembrance article as recited in claim 12, wherein a gap is created when successive laminates are placed in said stack.

14. A magnetic remembrance article as recited in claim 10, wherein said curable coating is cured by ultraviolet energy.

15. A magnetic remembrance article as recited in claim 10, wherein said magnetic layer has a force ranging from about 12 to about 22 poles per inch.

16. A magnetic remembrance article as recited in claim 10, where said image is produced from a subject contained in a group including sports teams, education groups, classes, institutions, businesses, departments, associations, affiliations, fraternities, sororities, unions, fellowships, memberships, guilds, leagues, orders, organizations, societies and combinations thereof.

* * * * *